Aug. 29, 1933.    C. A. TEA    1,924,470

SNUBBER

Filed Nov. 23, 1929

INVENTOR
Clark A. Tea
BY
*J Ing Harness*
ATTORNEY

Patented Aug. 29, 1933

1,924,470

UNITED STATES PATENT OFFICE 1,924,470

SNUBBER

Clark A. Tea, Detroit, Mich., assignor to Chrysler Corporation, Detroit, Mich., a corporation of Delaware Application November 23, 1929
Serial No. 409,404

11 Claims. (Cl. 188—130)

The main objects of this invention are to provide improved vehicle snubbers which will gradually arrest the rebound of a vehicle that follows compression of the spring upon which it is supported; to provide means of this kind which will not interfere with the normal cushioning action of the springs during downward movement of the vehicle body relative to the axle of the vehicle; to provide improved snubbers in which the bearing surfaces between relatively movable parts are tightly sealed against exposure to water and atmospheric conditions so as to produce uniform and balanced resistance to rebound at the various parts of a vehicle body.

Further objects of this invention are to provide improved means in a device of this kind for applying an initial frictional resistance to upward rebound when the vehicle body is at rest with respect to the axles, and gradually increasing the frictional resistance as the body is urged upwardly from its normal position; to provide means of this kind in which the initial frictional resistance to relative movement of the body and axle is materially reduced as the body is moved toward the axles upon which it is supported; and to provide an improved structure for yieldably supporting and frictionally gripping that part of a snubber which is rotatably mounted.

An illustrative embodiment of my invention is shown in the accompanying drawing, in which.

Figure 1:
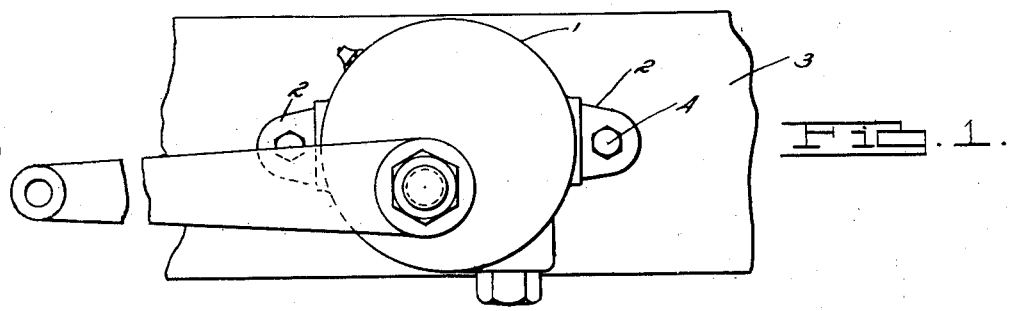
Fig. 1 is a side elevation of a snubber embodying my invention.

In the form shown, the improved snubber comprises a casing having a cover through which the shaft of a crank extends. The shaft is journaled in a contractable bearing which is yieldably suspended from the interior structure of the casing so as to allow rotation of the crank and bodily movement thereof relative to the casing. The interior of the casing is filled with a suitable lubricant which protects the engaging surfaces of the shaft and bearing against moisture.

In the illustration shown, the casing 1 comprises side flanges 2 by which it is rigidly secured to a chassis frame 3 by bolts 4. On the inner periphery of the casing 1 is provided a boss 5 having an aperture which extends from the interior to the exterior of the casing. A yieldable support comprising a spring member 6 is rigidly secured at one end to the boss 5 by a bolt 7 which extends through the aperture of the boss.

The spring 6 has a substantially cylindrical loop 8 formed at its free end and the extremity 9 of the looped end of the spring is spaced from the intermediate portion thereof so as to permit contraction of the loop.

Journaled in the loop 8 is a shaft 10 which extends outwardly from the casing 1 and has a crank arm 11 rigidly secured to its external end by a bolt 12. The shaft 10 has a head 10' by which it is held against displacement and a spiral groove 13 is formed in its periphery for admitting lubricant to the bearing surfaces of the loop and shaft respectively. The inner normal diameter of the loop 8 is somewhat smaller than the diameter of the shaft 10 and as a result an initial frictional resistance to rotation of the shaft is applied thereon by the loop 8.

A cover 14 threaded on the side of the casing is provided with an aperture 15 for receiving the external end 16 of the shaft 10. The aperture 15 is substantially larger in diameter than the external end 16 of the shaft and it permits bodily movement of the shaft and crank arm relative to the casing 1. Provided on the periphery of the casing 1 is a lubricant inlet valve 17 through which the interior of the casing may be filled with a suitable lubricant such as a mixture of 20% graphite in ordinary cylinder oil. The space between the external end 16 of the shaft and the periphery of the aperture 15 is closed by a tightly fitting leather washer 18 which is mounted on the shaft and located between the cover 14 and the adjacent end of the loop 8. The lubricant is thus confined in the casing and as the shaft 10 and loop 8 are substantially submerged in the lubricant, an air tight seal is provided for protecting the bearing surfaces of the shaft and loop respectively, from exposure to water and atmospheric conditions.

Figure 5:
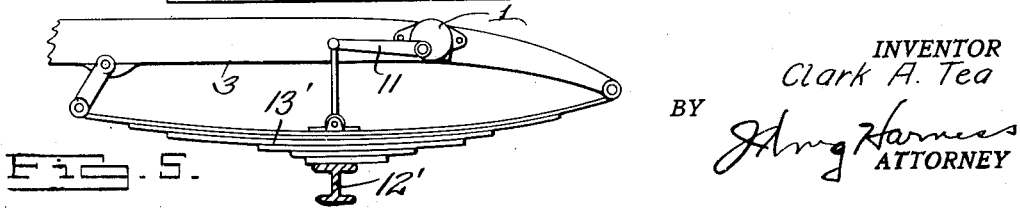
Fig. 5 is a diagrammatic, fragmentary side elevation of a front end portion of a vehicle which is equipped with my improved snubbers.

In operation, the free end 19 of the crank arm 11 is pivotally connected with an axle 12' of a vehicle, as illustrated in Fig. 5, so that as the chassis frame 3 of the vehicle is urged towards the axle thereof against the action of the supporting springs 13' of the vehicle upon which the chassis frame is mounted, the crank arm 11 and shaft 10 are rotated in a clockwise direction as viewed in Fig. 1. The clockwise rotation of the shaft 10 tends to unwrap the loop 8 and releases its initial grip upon the shaft. Frictional resistance between the shaft 10 and loop 8 is reduced during the downward movement of the body of the vehicle so as to permit the vehicle springs to function in their normal manner.

After the vehicle springs have been compressed sufficiently to absorb the downward thrust of the body, they tend to urge or rebound it upwardly. This upward movement of the body relative to the axle causes the crank arm 11 and shaft 10 to be rotated in a counterclockwise direction, as viewed in Fig. 1. Counterclockwise rotation of the shaft 10 tends to tighten the loop 8 and causes it to firmly grip the shaft producing a frictional resistance to the rebound of the body and chassis frame which gradually increases as the rotation continues. In this manner, the vehicle springs are permitted to efficiently absorb shock and vibration and the upward thrust of the springs is effectively checked so as to stabilize the vehicle body.

The air tight seal provided by the lubricant prevents changes from occurring in the condition of the bearing surfaces. This feature is particularly important for in actual installations 4 snubbers of the type shown in the drawing are mounted on a vehicle and if the bearing surfaces are exposed to atmospheric conditions, their frictional characteristics are altered in various degrees causing unbalanced snubbing.

Figure 2:
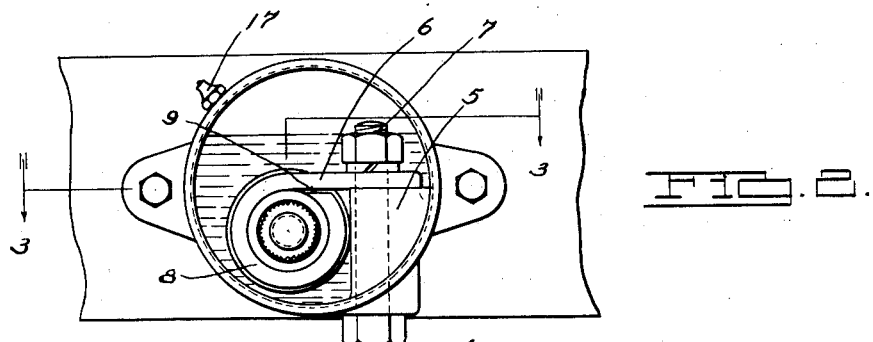
Fig. 2 is a side elevation similar to Fig. 1 with the cover and crank arm removed.
Figure 3:
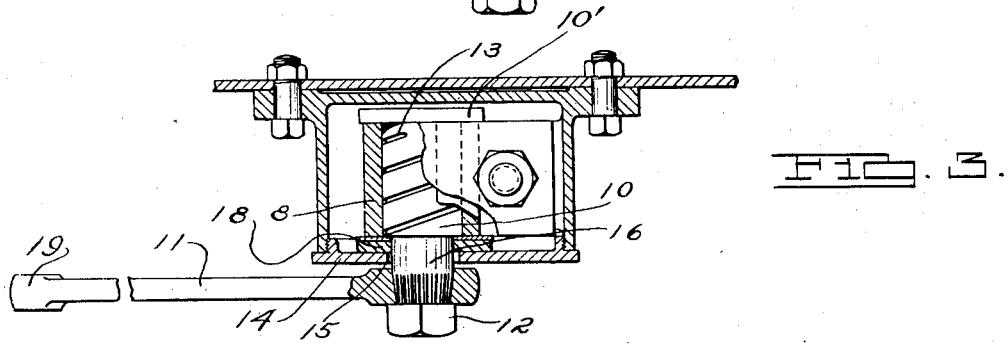
Fig. 3 is a horizontal section taken on line 3—3 of Fig. 2.
Figure 4:
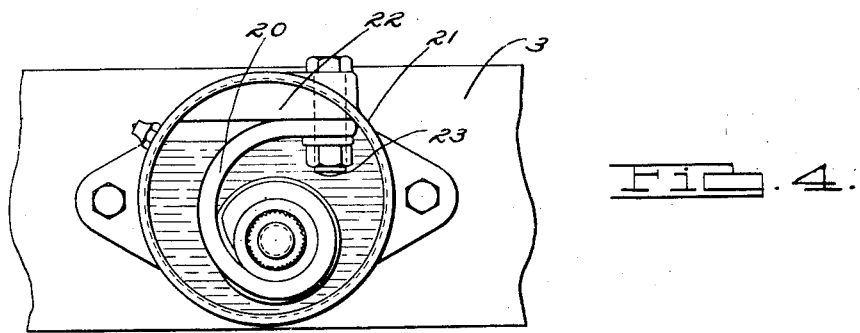
Fig. 4 is a side elevation showing a modified form of my invention.

In the modified form of my invention shown in Fig. 4, the yieldable support for the crank comprises a spring 20 which is wrapped more than one complete turn with respect to the shaft. This construction provides a more flexible mounting for the crank than that shown in Figs. 1, 2 and 3 in which the spring is coiled slightly less than a complete convolution. The spring 20 is confined within a casing 21 rigidly mounted to a boss 22 within the casing by a bolt 23.

Although but one specific embodiment of this invention has herein been shown and described, it will be understood that various changes including the size, shape and arrangement of parts, may be made without departing from the spirit of my invention, and it is not my intention to limit its scope other than by the terms of the appended claims.

I claim:

1. A device of the class described comprising a casing, a support in said casing comprising a bearing, and a shaft journaled in said bearing, said bearing being adapted to grip said shaft during rotation of the latter in one direction and to release said shaft during rotation thereof in the opposite direction.

2. A device of the class described comprising a casing, a shaft extending into said casing, means in said casing comprising a contractable bearing for rotatably supporting said shaft, said contractable bearing being adapted to frictionally resist rotation of said shaft with a gradually increasing force during rotation of said shaft in one direction and to gradually release said shaft during the rotation thereof in the opposite direction.

3. A device of the class described comprising a casing, a support in said casing comprising a bearing, a shaft journaled in said bearing, said bearing being adapted to grip said shaft during rotation of the latter in one direction and to release said shaft during rotation thereof in the opposite direction, and means in said casing for sealing the engaged surfaces of said shaft and bearing against exposure to atmospheric conditions.

4. A device of the class described comprising a casing, a shaft extending into said casing, a resilient member in said casing for yieldably supporting said shaft, including a contractable loop for frictionally resisting rotation of said shaft in one direction, and a crank arm rigidly mounted on the external end of said shaft.

5. A vehicle snubber comprising a casing adapted to be mounted on a chassis frame, a crank extending into said casing comprising a shaft and a crank arm, said arm being adapted for pivotal attachment to the axle of a vehicle, and a support in said casing for yieldably holding said shaft comprising means for resisting rotation thereof in one direction so as to prevent rebounding of said frame by the action of the vehicle springs after said frame and axle have been urged together.

6. The combination with a vehicle comprising a chassis frame, an axle and supporting springs, of a snubber comprising a casing secured to said frame, a crank having a shaft in said casing and an external arm pivotally attached to said axle, a support for yieldably suspending said shaft in said casing, and contractable means on said support for rotatably supporting said shaft, said contractable means being adapted to grip said shaft when said springs urge said frame away from said axle, and to release said shaft during movement of said frame towards said axle.

7. The combination with a vehicle comprising a chassis frame, an axle and supporting springs, of a snubber comprising a casing secured to said frame, a crank having a shaft in said casing and an external arm pivotally attached to said axle, a support for yieldably suspending said shaft in said casing, contractable means on said support for rotatably supporting said shaft, said contractable means being adapted to grip said shaft when said springs urge said frame away from said axle, and to release said shaft during movement of said frame towards said axle, and lubricant in said casing for sealing the engaged surfaces of said shaft and contractable means against exposure and moisture.

8. A snubber for vehicles comprising a housing adapted to be attached to one part of a vehicle, a crank comprising a shaft extending into said housing and an external crank arm for connecting said snubber with another relatively movable part of a vehicle, a support rigidly mounted in said housing comprising a spring having a substantially cylindrical loop at one end for rotatably supporting said shaft, the extremity of the looped end of said spring being spaced from the intermediate part thereof for permitting contraction of said loop, said loop being adapted to frictionally grip said shaft when said parts of the vehicle are urged away from each other, and to release said shaft when said parts are urged towards each other.

9. A snubber for vehicles comprising a housing adapted to be attached to one part of a vehicle, a cover on said housing having an aperture therein, a crank comprising a shaft extending through said aperture and an external arm for connecting said snubber with another relatively movable part of the vehicle, the diameter of said aperture being larger than the diameter of that portion of said shaft which extends through said aperture for allowing said crank to move relative to said housing, a yieldable support rigidly mounted in said housing comprising a spring having a substantially cylindrical loop at one end for rotatably supporting said shaft, the extremity of the looped end of said spring being spaced from the intermediate part thereof for allowing contraction of said loop, said loop being adapted to frictionally grip said shaft when said parts of the vehicle are urged away from each other, and to release said shaft when said parts are urged toward each other, means in said housing for closing the space between the peripheries of said shaft and aperture, and a lubricant in said housing for sealing the adjacent surfaces of said loop and shaft against exposure to atmospheric conditions.

10. In a vehicle snubber, a support adapted for attachment to one of a pair of relatively movable parts of a vehicle chassis and including a coiled resilient member having more than one complete convolution, and a shaft journaled in the innermost convolution, the innermost convolution of said coiled resilient member being adapted to grip said shaft during rotation of the latter in one direction and to release said shaft during rotation thereof in the opposite direction.

11. In apparatus for controlling relative movement of a pair of bodies, means securable to one of said bodies including a journal portion, and a support securable to the other body including a resilient element having one end fixed to said support and having a free end portion coiled about said journal portion and normally having an inherent self-energized prehensile grip upon the latter, said resilient element being adapted to increase its grip upon said journal portion during rotation thereof in one direction and to decrease its grip during rotation of said journal portion in an opposite direction.

CLARK A. TEA.